United States Patent [19]
Griesenbrock

[11] 3,844,121
[45] Oct. 29, 1974

[54] MULTIPLE STAGE MASTER CYLINDER
[75] Inventor: Karl-Heinz Griesenbrock, Duisburg, Germany
[73] Assignee: Eaton Corporation, Cleveland, Ohio
[22] Filed: Feb. 16, 1973
[21] Appl. No.: 333,423

[30] Foreign Application Priority Data
Feb. 21, 1972  Germany................ 2208039

[52] U.S. Cl.................. 60/562, 60/533, 192/13 R
[51] Int. Cl............................................. F16d 67/02
[58] Field of Search............ 192/13 R; 60/581, 562, 60/579, 533

[56] References Cited
UNITED STATES PATENTS
3,683,619  8/1972  Belart .................................. 60/562
3,746,135  7/1973  Ishikawa ........................... 192/13 R FOREIGN PATENTS OR APPLICATIONS
1,193,370  5/1965  Germany ......................... 192/13 R
1,000,564  8/1965  England ............................... 60/562

Primary Examiner—Samuel Scott
Assistant Examiner—Allan R. Burke
Attorney, Agent, or Firm—Teagno & Toddy

[57] ABSTRACT

A master cylinder for a vehicle brake incorporating separate filling and braking pressure stages, the filling stage employing a relatively large diameter piston with short pedal stroke and the braking stage employing a relatively smaller diameter piston with a relatively longer stroke. A clutching stage operable during the filling stage provides single pedal clutch and brake actuation for inching operations. One embodiment provides integral braking, filling and clutching stages with mechanical actuation of the filling stage, while an alternative embodiment provides a separate filling stage with hydraulic actuation.

14 Claims, 4 Drawing Figures

PATENTED OCT 29 1974

MULTIPLE STAGE MASTER CYLINDER

The invention relates to a multiple-stage master cylinder for a hydraulic vehicle brake and clutch having a filling stage for applying the brake with short operating motion and large displacement of hydraulic fluid and a braking stage for the braking-pressure action with small displacement of hydraulic fluid.

In a hydraulic braking system it is desirable to achieve short pedal travel with moderate pedal pressure. However, these characteristics are inherently incompatible since short pedal travel generally dictates the use of a large diameter piston and moderate pedal pressure generally dictates the use of a long piston stroke.

A generally known solution of the problem is to equip vehicles with booster-brake installations wherein the large cylinder-operating forces required are supplied by a power booster driven by or otherwise dependent upon the vehicle engine; however, this involves the risk of the driver being unable to achieve sufficient braking even with maximum foot pressure after a failure of the booster due to a defect, for instance through leakage or engine trouble. Moreover, power boosters may require too much space for installation in an industrial vehicle.

Another known solution consists, in principle, in providing a multiple-stage master cylinder effecting the application of the brake with a large piston for the purpose of minimizing pedal motion and actual braking with a small piston for the purpose of minimizing the pedal force.

In the industrial truck field another problem presented by known devices of this type is that they are generally not suited for "inching," that is the simultaneous operation of brake and clutch for ease of control by means of single-pedal operation. For ideal inching characteristics there should be some perceptible distinction to the operator between the points where clutch actuation and brake actuation occur; however, this is difficult to accomplish in that the position of the brake applying point is shifted with varying amount of filling. These factors are an impediment to heavy load vehicles, in particular to mobile machines, such as industrial lift trucks whose inching movements must be very precisely and sensitively controllable to protect people and loads in case of difficult load handling.

Accordingly, an important object of the invention is to provide a brake master cylinder combining short pedal travel and low pedal pressure.

Another object of the invention is to provide a brake master cylinder having two operational stages, a filling stage for filling the wheel cylinders at relatively low pressure, and a braking stage for applying vehicle braking pressure.

Another object of the invention is to provide a master cylinder as described above which is adaptable for simultaneous clutch operation to provide vehicle inching capability.

Another object of the invention is to provide a combined brake and clutch master cylinder consistent with the above objects in which the commencement of clutch actuation and the commencement of braking pressure actuation are distinct and perceptible to an operator by the manner in which the pedal operates.

In accordance with the present invention the above objectives are achieved by providing a two stage master cylinder and including a further stage for operating a clutch, said stage effecting the clutching process during the operation of the filling stage, such that the actuation of the braking stage is started after completion of the filling and clutching stages, obviating the operating force for the filling stage during braking. Such a design permits maintaining the advantages of the known multiple-stage master cylinders, namely total operating motion designed to be short and operating force for the brake designed to be small and, at the same time, the clutch is operated in such a manner that the driver knows at any time in which range he is when operating the pedal, so that, for instance, the vehicle can be very precisely and sensitively maneuvered for depositing the load, for instance when driving a heavy elevated load to a shelf or the like.

According to a preferred embodiment of the invention a control valve separates one cylinder-pressure compartment of the braking stage from one cylinder-pressure compartment of the clutching stage and the filling stage is operated mechanically via the clutching stage, resulting in a compact one-piece multiple-stage master cylinder.

If required or wanted for other reasons, the filling stage can be separate, and operated hydraulically by means of the pressure in the clutching stage.

It is, moreover, highly advantageous to design the filling stage to have a somewhat larger volume than is required for normal application of the brake and provide it with a pressure-limiting valve adjusted to have a safety allowance and correspond to the brake-restoring force. By this means, the hydraulic fluid first not used is forced out through the hydraulically opening pressure-limiting valve in the direction of the fluid reservoir on completion of the application process, while the position of the brake-application point relative to the position of the control path for the inching range always remains unchanged with increasing and varying volume requirement due to brake-lining wear.

Other objects and advantages of the invention will be apparent from the specification when taken in connection with the accompanying drawings, wherein.

Figure 1:
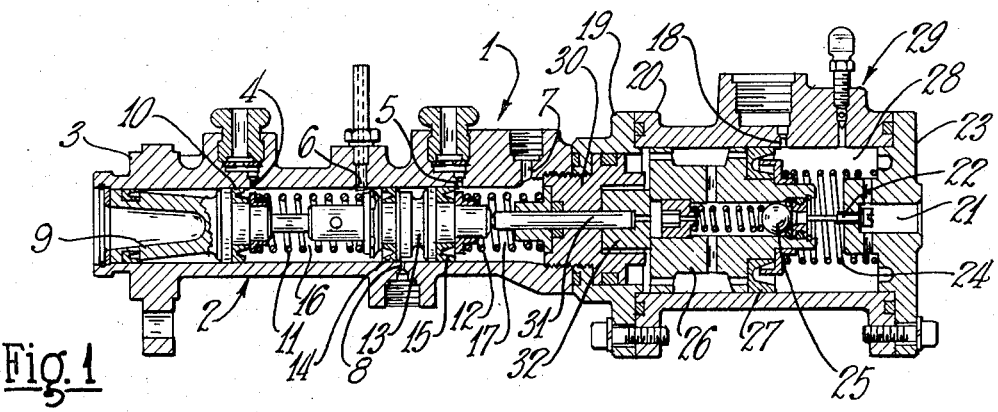
FIG. 1 is a longitudinal sectional view of the multiple-stage master cylinder according to the invention with mechanical operation of its filling stage.

The embodiment of the invention according to FIG. 1 essentially comprises a master cylinder assembly 2, including a braking and clutch stage housing 3 and filling stage housing 29. The housing 3 includes galleries 4, 5, 6, 7, 8 for connection to other components of the hydraulic system (see FIG. 2), pressure chamber 16 defining a working chamber for piston 9, and pressure chamber 17 defining a working chamber for a control valve 13. Compression springs 11 and 12 bias the piston 9 and valve 13 respectively into the positions shown. The filling stage housing 29 is formed by housing members 19 and 20 attached to the housing 3 and includes gallery 18 formed in the member 20, gallery 21 formed in end plate 23, and a pressure chamber 28 defining a working chamber for a filling piston 26. Compression spring 24 biases the filling piston into the position shown. The filling stage also includes an adjustable pressure limiting valve 25. An operating rod 31 with end piece 32 is guided and supported by an intermediate member 30 between the housings 3 and 29 and extends from valve 13 in the braking and clutching stage to engage piston 26 in the filling stage.

Figure 2:
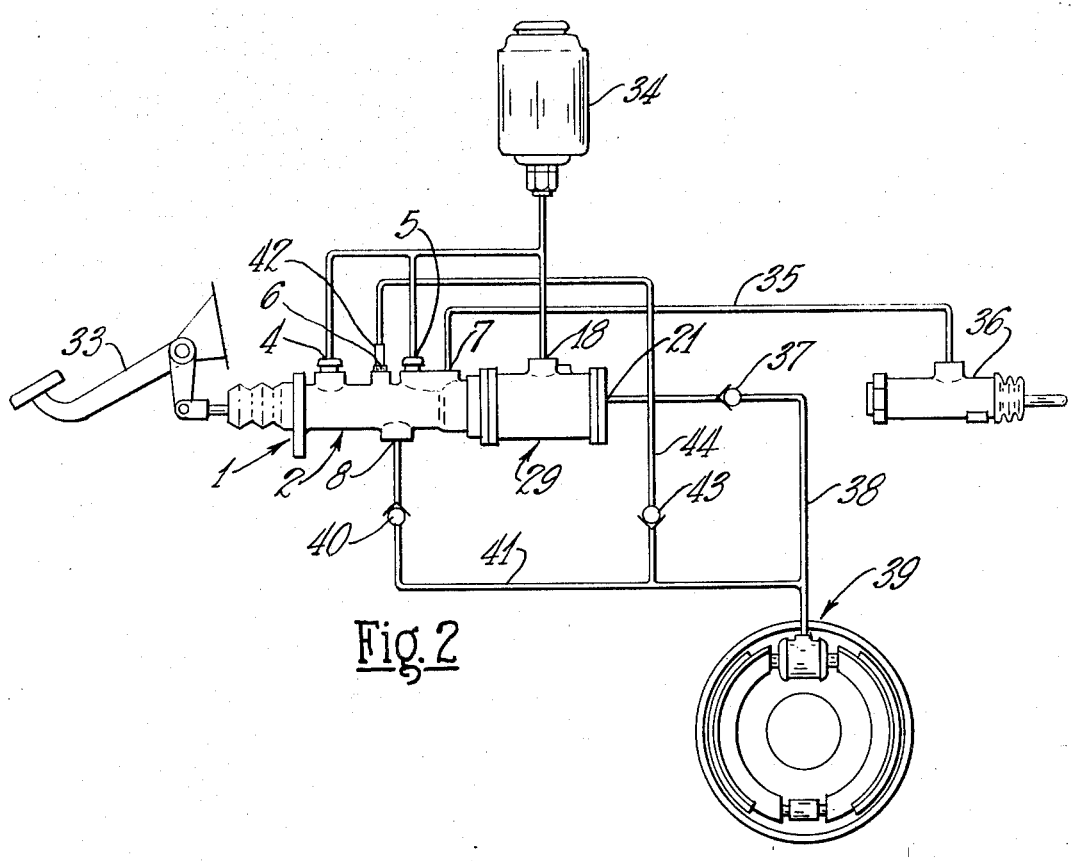
FIG. 2 depicts the multiple-stage master cylinder according to FIG. 1 in a diagrammatic layout of a hydraulic clutch and brake installation.

Referring to FIG. 2, the multiple-stage master cylinder 1 which is arranged to be actuated by a pedal 33 is connected with the feed tank or reservoir 34 via its galleries 4, 5, and 18 and via lines not illustrated here and provided with further operating connections, namely from its gallery 7 to a clutch-slave cylinder 36 via a clutch line 35, from its gallery 21 to a drum brake 39 via a filling line 38 with a check valve 37 being interposed, from its gallery 8 to a drum brake 39 via the brake line 41 with a check valve 40 being interposed and, finally, from its gallery 6 to the brake line 41 between check valve 40 and the drum brake 39 via a throttle valve 42 and via a return-flow line 44 with a check valve 43 being interposed. The type of brake does not matter, since the unit can also be equipped with other hydraulically operated brakes, such as a disk brake or the like.

Figure 3:
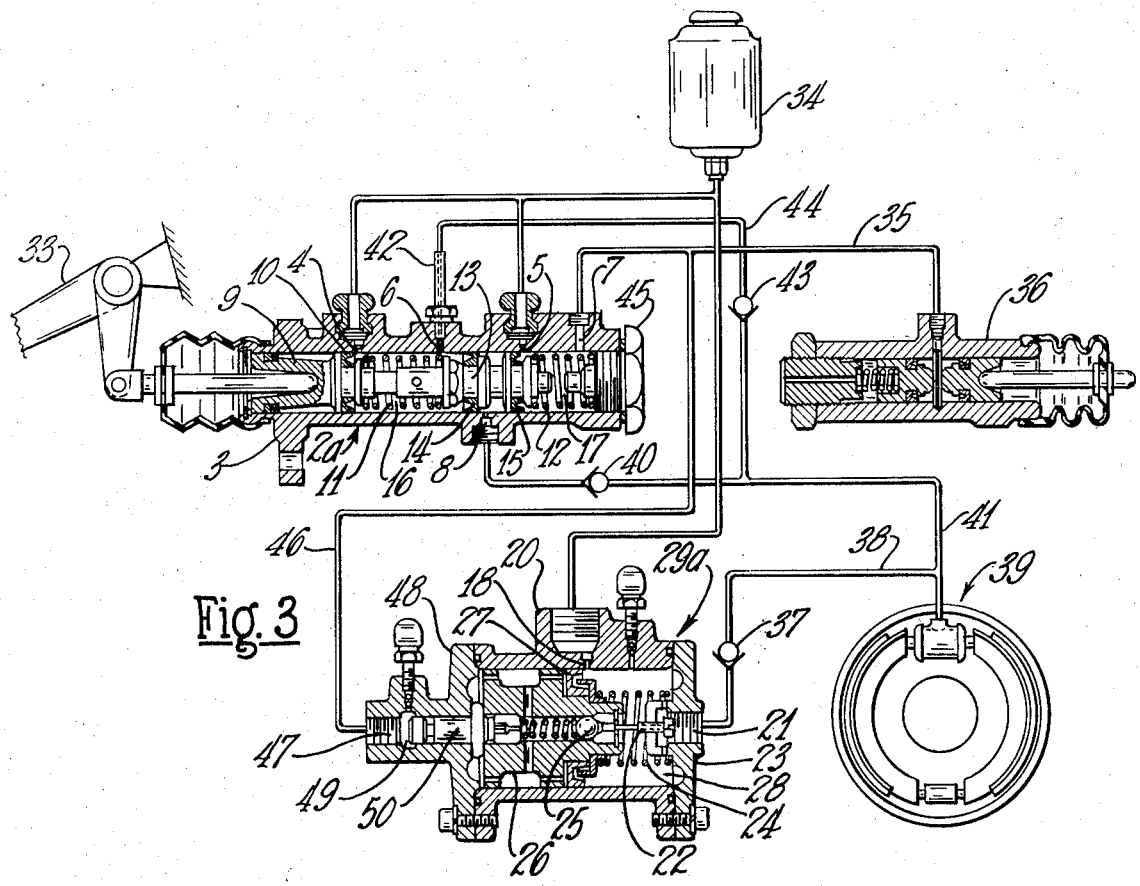
FIG. 3 is a diagrammatic layout of a hydraulic clutch and brake installation including a longitudinal section of a separated multiple-stage master cylinder with hydraulic operation of its filling stage.

The construction of the clutch and brake installation diagrammatically represented in FIG. 3 corresponds, in principle, to that of the unit described above in accordance with FIG. 2, however, the multiple-stage master cylinder is now separated, i.e. a master cylinder 2a closed by a plug 45 supporting the compression spring 12 and the pressure compartment 17 communicating with a cover 48 of a filling stage 29 via a gallery 47 and with a branch line 46 originating from the clutch line 35, said cover 49 also containing a pressure compartment 49 and a sealed operating piston 50.

The working principle of the above-described parts according to FIGS. 1 and 2 is as follows: When the multiple-stage master cylinder 1 is operated through the pedal 33, the galleries communicating with the fluid reservoir 34 are first closed, namely first gallery 4 by the packing 10 of the piston 9 and then gallery 5 by the packing 15 of the hydraulically shifted control valve 13 and, at the same time, gallery 18 by the packing 27 of the filling piston 26, which is mechanically shifted by the control valve 13 by means of operating rod 31 acting through end piece 32. On further actuation, the hydraulic fluid inside the pressure compartment 17 for acting upon the clutch-slave cylinder 36 (see FIG. 2) is displaced via the gallery 7 and via the clutch line 35, with the distance between the control valve 13 and the piston 9 remaining practically equal, while hydraulic fluid is simultaneously fed to the drum brake 39 from the pressure compartment 28 via gallery 21, check valve 37, and filling line 38. Upon completion of the filling process, the hydraulic fluid is forced out in the direction of the reservoir 34 via pressure-limiting valve 25 adjusted to have a safety allowance and correspond to the brake-restoring force. Then, the pressure-limiting valve 25 is mechanically opened for the remaining motion of the filling piston 26 after its impingement on the stop screw 22 through which the pressure compartment 28 is completely relieved of pressure and, consequently, the operating force depending on the amount of filling for clearing the gallery 8 and for the ensuing braking-pressure action on the drum brake 39 through further action on the hydraulic fluid by the piston 9 via the gallery 8, check valve 40, and via the brake line 41 is obviated. After braking, the parts longitudinally shifted within the multiple-stage master cylinder 1 are returned into their starting positions by the compression springs 11, 12, and 24. During this process, the pressure compartment 28 is filled with hydraulic fluid returning from the drum brake 39 to the pressure compartment 16 and from the clutch-slave cylinder 36 to the pressure compartment 17. The rate of return flow of hydraulic fluid coming from a quickly lifting brake can be adapted to the filling period of the filling stage 29 by interposing a throttle valve 42.

Unlike the unit according to FIGS. 1 and 2 having a compact multiple-stage master cylinder, the unit according to FIG. 3 having separated multiple-stage cylinders 2a, 29a corresponds to the condition of installation where the filling stage 29a cannot be fitted directly to the master cylinder 2a for reasons of space.

The functional working principle of the unit according to FIG. 3 corresponds to that described for FIGS. 1 and 2. However, in this case, the operation of the filling stage 29a from the clutching stage of the master cylinder 2a is not effected mechanically, but hydraulically, emanating from the pressure compartment 17 via gallery 7, part of clutch line 35, branch line 46, gallery 47, and the pressure compartment 49 through action on the sealed operating piston 50 shifting the filling piston 26.

Figure 4:
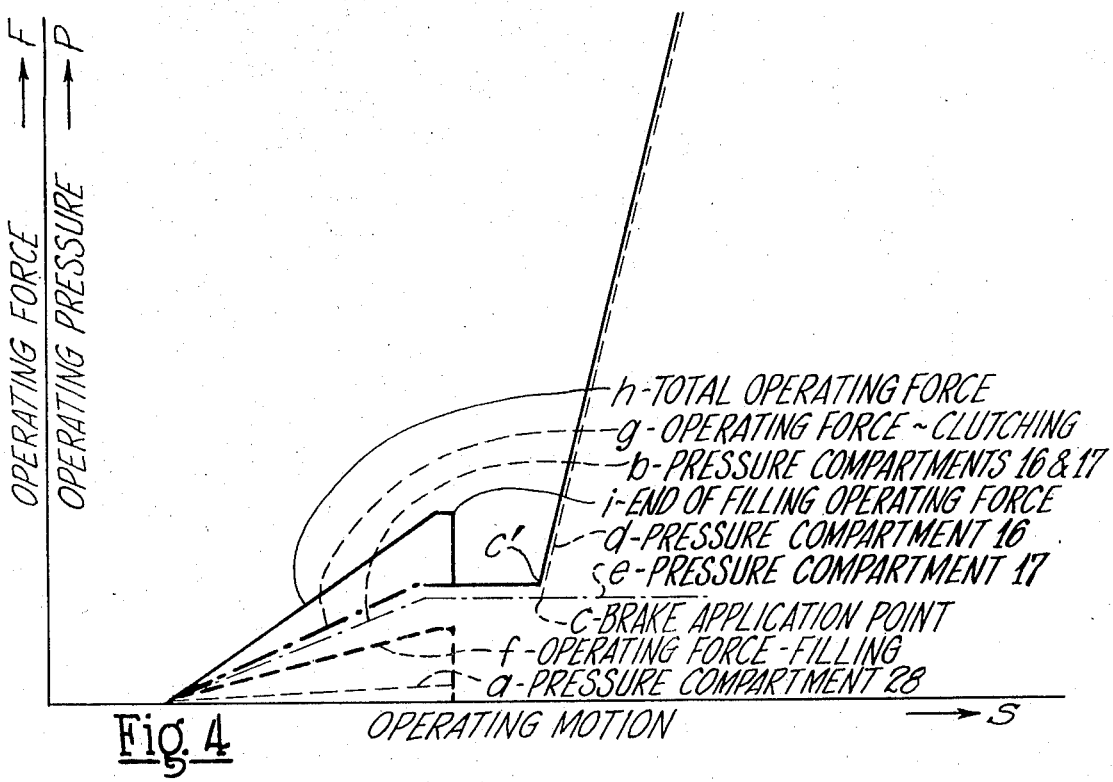
FIG. 4 is a characteristic operating force and motion diagram of the multiple-stage master cylinder of the invention.

FIG. 4 is a representation of the characteristic operating force and motion diagram of the multiple-stage master cylinder according to the invention with the pressure built up in the individual stages taken into consideration. The pressure curves are plotted with thin lines and the operation curves with thick lines. In particular: Curve a of the pressure compartment 28 is plotted with a thin dash line, the common curve b of the pressure compartments 16 and 17 with a thin dash-dotted line as far as the brake-application point c, curve d of the pressure compartment 16 with a thin dash line starting from the brake-application point c, curve e continuing from the brake-application point c of the pressure compartment 17 with a thin dash-dotted line, the operating force curve f for the filling process with a thick dash line, the operating force curve g for the clutching process with a thick dash-dotted line and, finally, the total operating force curve h with a thick continuous line clearly showing that, starting from point i, where the operating force for the filling process is eliminated, the clutching process with simultaneous filling process is perceptibly separated from the braking process starting from point c' by a spatial distance.

I claim:

1. A hydraulic braking and clutching system comprising a hydraulic pressure cylinder, a first chamber formed in said cylinder, a first gallery communicating said first chamber with a fluid reservoir, a second gallery communicating with at least one wheel brake cylinder for pressurizing said cylinder, a third gallery communicating said first chamber with said wheel cylinder for return flow to said first chamber, a first piston linearly movable within said first chamber between a first inoperative position to a second position in which said first chamber is pressurized, a second chamber formed in said cylinder, a fourth gallery communicating said second chamber with said fluid reservoir, a fifth gallery communicating said second chamber with a clutch slave cylinder, a valve member linearly movable within said second chamber between a first inoperative position and a second position in which said second chamber is pressurized, a second pressure cylinder, a third chamber formed within said second cylinder, a first gallery communicating said third chamber with said reservoir, a second gallery communicating said third chamber with said wheel cylinder, a second piston linearly movable within said third chamber between a first inoperative position and a second position in which said third chamber is pressurized, pressure limiting means within said third chamber for limiting the pressurization of said third chamber to a predetermined maximum, and means operatively connected to said valve member for moving said second piston from said first to said second position upon movement of said valve member.

2. Apparatus as claimed in claim 1 including means for moving said first piston from said inoperative to said operative position, the pressurization of said first chamber resulting in movement of said valve member from said inoperative to said operative position and corresponding movement of said second piston from said first to said second position.

3. Apparatus as claimed in claim 1, in which said means operatively connected to said valve member comprises a mechanical link engageable with said second piston.

4. Apparatus as claimed in claim 1 in which said means operatively connected to said valve member comprises a hydraulic connection between said second and third chambers.

5. Apparatus as claimed in claim 1 in which said pressure limiting means comprises means defining a return flow path from said third chamber to said reservoir, a normally closed valve member within said return flow path, and means maintaining said valve member in said normally closed position until a predetermined pressure is obtained in said third chamber.

6. Apparatus as claimed in claim 5 including mechanical stop means within said third chamber, said mechanical stop means being engageable with said pressure limiting valve means to open said return flow path upon predetermined movement of said second piston from said inoperative position toward said operative position.

7. A master cylinder for a hydraulic vehicle brake comprising a filling stage including a pressure chamber and piston and incorporating a short operating stroke with a large displacement of hydraulic fluid, a braking stage including a pressure chamber and piston and incorporating a small displacement of hydraulic fluid relative to the filling stage, a clutch stage including a pressure chamber and control valve actuated upon movement of the braking stage piston for operating a clutch-actuating slave cylinder, and a valve element separating the pressure chamber of said braking stage from the pressure chamber of said clutch stage, said filling stage being operable by means associated with said clutch stage, said clutch stage being operable during the filling stage, and said braking stage becoming operable after the end of said filling and clutch stages.

8. Apparatus as claimed in claim 7, in which said filling stage is operably associated with said clutching stage by mechanical means.

9. Apparatus as claimed in claim 7, in which said filling stage is operably associated with said clutching stage by hydraulic means.

10. Apparatus as claimed in claim 7 in which said filling stage includes pressure limiting means adjustable to correspond to the brake restoring force.

11. Apparatus as claimed in claim 10, including a filling piston within said filling stage, and including means for mechanically opening said pressure limiting means after predetermined movement of said filling piston.

12. Apparatus as claimed in claim 11 in which said pressure limiting means comprises valve means contained within said filling piston.

13. Apparatus as claimed in claim 7, including means for returning hydraulic fluid to said braking stage when the brake is released.

14. Apparatus as claimed in claim 13 including a throttle valve in said return flow line.

* * * * *